(12) United States Patent
Lambach et al.

(10) Patent No.: US 11,642,687 B2
(45) Date of Patent: May 9, 2023

(54) METHODS AND SYSTEMS FOR MANUFACTURING FOAM WALL STRUCTURES

(71) Applicant: Covestro LLC, Pittsburgh, PA (US)

(72) Inventors: James L. Lambach, McMurray, PA (US); Michael F. Palmosina, II, Baden, PA (US); Scott Cloherty, Canonsburg, PA (US)

(73) Assignee: Covestro LLC, Pittsburgh, PA (US)

( * ) Notice: Subject to any disclaimer, the term of this patent is extended or adjusted under 35 U.S.C. 154(b) by 176 days.

(21) Appl. No.: 16/790,088

(22) Filed: Feb. 13, 2020

(65) Prior Publication Data

US 2021/0252543 A1 Aug. 19, 2021

(51) Int. Cl.
| | | |
|---|---|---|
| *B05B 13/04* | (2006.01) | |
| *B25J 9/00* | (2006.01) | |
| *B25J 9/16* | (2006.01) | |
| *B25J 19/02* | (2006.01) | |
| *B29K 105/04* | (2006.01) | |
| *B29C 70/02* | (2006.01) | |
| *B29C 65/00* | (2006.01) | |

(52) U.S. Cl.
CPC ......... *B05B 13/0431* (2013.01); *B25J 9/0018* (2013.01); *B25J 9/1679* (2013.01); *B25J 19/023* (2013.01); *B29C 66/863* (2013.01); *B29C 70/026* (2013.01); *B29K 2105/04* (2013.01)

(58) Field of Classification Search
CPC ... B05B 13/0431; B25J 9/0018; B25J 9/1679; B25J 19/023; B29C 66/863; B29C 70/026; B29K 2105/04
See application file for complete search history.

(56) References Cited

U.S. PATENT DOCUMENTS

| | | | | |
|---|---|---|---|---|
| 2,009,619 | A | * | 7/1935 | Huffine ................. E04B 1/7666 |
| | | | | 52/794.1 |
| 2,030,157 | A | | 2/1936 | Cumpston |
| 2,055,032 | A | | 9/1936 | Degian |

(Continued)

FOREIGN PATENT DOCUMENTS

| | | |
|---|---|---|
| CN | 108031588 A | 5/2018 |
| DE | 202014004695 U1 | 7/2014 |

(Continued)

OTHER PUBLICATIONS

European Search Report for Application No. EP 21 15 5938, dated Jun. 21, 2021.

*Primary Examiner* — George R Koch
(74) *Attorney, Agent, or Firm* — Donald R. Palladino

(57) ABSTRACT

Methods for manufacturing foam wall structures are described. The methods include placing a wall structure proximate to a robotic arm, orienting an imaging device so that the imaging device on the robotic arm faces a cavity in the wall structure, surveying the cavity using the imaging device, determining a spray foaming pattern to fill the cavity to a selected depth with a foam layer, orienting the spray nozzle so the spray nozzle faces the cavity, and spray-applying the foam-forming composition into the cavity to the selected depth by passing the foam-forming composition through the spray nozzle to form the foam layer. Foam wall structure manufacturing systems that are suitable for carrying out such methods are also described.

22 Claims, 6 Drawing Sheets

(56) References Cited

U.S. PATENT DOCUMENTS

| | | | |
|---|---|---|---|
| 2,271,929 A | 2/1942 | Venzie | |
| 2,745,779 A | 5/1956 | Ritter | |
| 2,780,090 A * | 2/1957 | Rasmussen | E04B 1/7675 52/407.3 |
| 3,619,437 A * | 11/1971 | McDonald, Jr. | E04F 15/18 264/46.7 |
| 4,236,361 A | 12/1980 | Boden | |
| 4,292,775 A | 10/1981 | Howard | |
| 4,443,988 A * | 4/1984 | Coutu, Sr. | E04B 1/80 52/586.1 |
| 4,471,591 A | 9/1984 | Jamison | |
| 4,671,038 A | 6/1987 | Porter | |
| 4,765,105 A * | 8/1988 | Tissington | E04C 2/382 52/309.11 |
| 4,786,547 A * | 11/1988 | St-Michel | B32B 5/18 428/317.1 |
| 4,856,244 A | 8/1989 | Clapp | |
| 4,885,886 A | 12/1989 | Rosso | |
| 5,353,560 A * | 10/1994 | Heydon | E04B 7/22 52/592.1 |
| 5,389,167 A | 2/1995 | Sperber | |
| 5,950,386 A * | 9/1999 | Shipman | E04F 11/00 52/239 |
| 5,950,389 A | 9/1999 | Porter | |
| 5,953,883 A | 9/1999 | Ojala | |
| 5,979,131 A * | 11/1999 | Remmele | E04B 1/762 52/302.3 |
| 6,085,479 A | 7/2000 | Carver | |
| 6,205,729 B1 | 3/2001 | Porter | |
| 6,308,491 B1 | 10/2001 | Porter | |
| 6,314,695 B1 | 11/2001 | Belleau | |
| 6,332,304 B1 | 12/2001 | Fuhrman | |
| 6,408,594 B1 | 6/2002 | Porter | |
| 6,438,915 B1 | 8/2002 | Beauboeuf | |
| 6,481,172 B1 | 11/2002 | Porter | |
| 6,715,249 B2 * | 4/2004 | Rusek | E04C 2/246 428/317.1 |
| 7,036,284 B1 * | 5/2006 | Larson | E04F 13/06 52/506.1 |
| 8,635,778 B1 | 1/2014 | Hagaman | |
| 8,959,862 B1 | 2/2015 | Kreizinger | |
| 9,145,688 B2 * | 9/2015 | Hunt-Hansen | E04F 13/0803 |
| 9,562,359 B1 * | 2/2017 | Grisolia | B32B 3/266 |
| 9,938,711 B2 * | 4/2018 | Grisolia | E04B 2/562 |
| 10,006,198 B2 * | 6/2018 | Parsons | E04B 1/80 |
| 10,183,425 B2 * | 1/2019 | Arnauts | B29C 44/18 |
| 10,294,668 B2 | 5/2019 | Kreizinger | |
| 10,301,823 B2 | 5/2019 | Kreizinger | |
| 10,370,849 B2 * | 8/2019 | Lambach | E04B 1/10 |
| 10,415,244 B2 * | 9/2019 | Giles | E04C 2/292 |
| 10,478,972 B2 * | 11/2019 | Lipinski | B25J 11/0055 |
| 10,875,044 B2 | 12/2020 | Taylor et al. | |
| 11,077,457 B2 | 8/2021 | Lipinski et al. | |
| 2002/0012785 A1 | 1/2002 | Leduc | |
| 2002/0108320 A1 * | 8/2002 | Weiss | E04B 1/14 52/270 |
| 2002/0129577 A1 * | 9/2002 | Weiss | E04B 1/14 52/270 |
| 2003/0041544 A1 | 3/2003 | Devalapura | |
| 2004/0016194 A1 | 1/2004 | Alvaro | |
| 2004/0200171 A1 | 10/2004 | Schilger | |
| 2005/0055973 A1 | 3/2005 | Hagen, III et al. | |
| 2005/0106360 A1 | 5/2005 | Castiglione et al. | |
| 2005/0188649 A1 | 9/2005 | Hagen, III | |
| 2005/0247021 A1 | 11/2005 | Schauffele | |
| 2006/0026925 A1 | 2/2006 | Strawmen | |
| 2007/0094963 A1 | 5/2007 | McDonald et al. | |
| 2009/0008058 A1 | 1/2009 | Chaudhry et al. | |
| 2009/0098357 A1 | 4/2009 | Bergtold | |
| 2009/0320397 A1 * | 12/2009 | Hansbro | E04H 5/10 52/302.1 |
| 2010/0011701 A1 * | 1/2010 | Cole | B26D 3/008 52/749.1 |
| 2010/0043327 A1 | 2/2010 | Rothwell | |
| 2010/0095613 A1 | 4/2010 | Paetkau | |
| 2011/0138724 A1 | 6/2011 | Olang | |
| 2011/0173911 A1 * | 7/2011 | Propst | B32B 13/045 427/403 |
| 2011/0214374 A1 * | 9/2011 | Propst | B32B 3/18 428/428 |
| 2011/0302877 A1 * | 12/2011 | Gilgan | E04C 2/386 52/742.13 |
| 2012/0011792 A1 | 1/2012 | Bergtold et al. | |
| 2012/0028563 A1 | 2/2012 | Sacks | |
| 2012/0096785 A1 * | 4/2012 | Weeks | E04B 1/08 700/98 |
| 2012/0159765 A1 * | 6/2012 | Propst | B32B 37/18 427/403 |
| 2012/0240501 A1 * | 9/2012 | Spiegel | E04B 1/26 52/404.4 |
| 2012/0247040 A1 * | 10/2012 | Buoni | E04F 13/04 52/302.1 |
| 2013/0037984 A1 * | 2/2013 | Arnauts | E04C 2/388 425/510 |
| 2013/0104469 A1 | 5/2013 | Fay | |
| 2013/0104480 A1 * | 5/2013 | Smith | E04B 2/847 52/309.7 |
| 2013/0305643 A1 * | 11/2013 | Singleton | G06F 30/13 52/404.1 |
| 2013/0312350 A1 | 11/2013 | Kreizinger | |
| 2014/0053486 A1 * | 2/2014 | Grisolia | E04C 2/386 52/309.7 |
| 2014/0115991 A1 | 5/2014 | Davenport et al. | |
| 2014/0250827 A1 | 9/2014 | Gillman | |
| 2014/0265027 A1 | 9/2014 | Kreizinger | |
| 2015/0111001 A1 * | 4/2015 | Sagnard | E04B 1/94 428/159 |
| 2015/0140243 A1 * | 5/2015 | Sagnard | B32B 5/028 428/34.7 |
| 2016/0121486 A1 * | 5/2016 | Lipinski | B05B 13/005 427/427.3 |
| 2017/0030074 A1 * | 2/2017 | Ndobo-Epoy | E04C 2/205 |
| 2017/0080438 A1 | 3/2017 | Storr | |
| 2017/0260765 A1 | 9/2017 | Spicer et al. | |
| 2018/0112394 A1 | 4/2018 | Giles | |
| 2018/0264640 A1 * | 9/2018 | Holloway | B05B 13/0627 |
| 2018/0363298 A1 * | 12/2018 | Giles | B32B 15/085 |
| 2019/0118206 A1 * | 4/2019 | Holloway | B25J 9/06 |
| 2021/0238850 A1 | 8/2021 | Baily et al. | |

FOREIGN PATENT DOCUMENTS

| | | |
|---|---|---|
| IE | 20050080 A1 | 8/2006 |
| JP | 5546961 A | 4/1980 |
| JP | 56000437 A | 1/1981 |
| JP | 60108609 U | 7/1985 |
| JP | 3115643 A2 | 5/1991 |
| JP | H07112445 A | 5/1995 |
| JP | 11200521 A2 | 7/1999 |
| JP | 2008132676 A | 6/2008 |
| JP | 2009101562 A | 5/2009 |
| JP | 3159655 U | 5/2010 |
| JP | 2013091246 A | 5/2013 |
| WO | 9914442 A1 | 3/1999 |
| WO | 9929978 A1 | 6/1999 |
| WO | WO-2019237034 A1 * | 12/2019 ......... B27M 3/0013 |

* cited by examiner

METHODS AND SYSTEMS FOR MANUFACTURING FOAM WALL STRUCTURES

FIELD

The inventions described in this specification relate to methods and systems for manufacturing foam wall structures.

BACKGROUND

Relatively recently, insulated wall structures satisfying strict industry insulation requirements have been developed that can be made without excessive material and labor costs. According to one proposal, a foam wall structure includes a foam panel, such as a faced polyisocyanurate panel, attached to at least a portion of a front frame surface, such that the faced polyisocyanurate panel and frame members define one or more voids within the frame; and a foam layer received within at least a portion of one of the voids within the frame, wherein the foam layer adheres to at least a portion of the faced polyisocyanurate panel.

Such foam wall structures can provide many benefits. They can exhibit high racking shear strength and excellent thermal resistance. Moreover, they can be fabricated in a manufacturing facility that is away from the construction site, thus increasing the likelihood of consistent results/performance, all while reducing installation labor and material costs.

One aspect of the process for manufacturing such foam wall structures is the spray application of a foam-forming composition into the void(s) formed by the frame elements and the foam panel. Development of an effective automated process for this spray foam application that has the potential to result in, for example, high wall production line speeds, low product variation, minimal waste of spray foam raw materials, and/or minimal use of manual labor, would, therefore, be highly desirable.

The inventions described in this specification were made in view of the foregoing.

SUMMARY

In certain respects, this specification relates to methods for manufacturing foam wall structures. These methods comprise: (a) placing a wall structure proximate to a robotic arm, the wall structure comprising: (1) a frame comprising a first member, a second member that is spaced apart from the first member, and connecting members extending between the first member and the second member, wherein a front surface of the first member, a front surface of the second member, and a front surface of the connecting members form a front frame surface; and (2) a panel attached to the front frame surface so that the panel, the first member, the second member, and the connecting members define a cavity, wherein the robotic arm comprises: (1) a spray nozzle, and (2) an imaging device; (b) orienting the imaging device so that the imaging device faces the cavity; (c) surveying the cavity using the imaging device; (d) determining a spray foaming pattern to fill the cavity to a selected depth with a foam layer; (e) orienting the spray nozzle so the spray nozzle faces the cavity; and (f) spray-applying a foam-forming composition into the cavity according to the spray foaming pattern by passing the foam-forming composition through the spray nozzle to form the foam layer.

In other respects, the specification relates to methods for manufacturing foam wall structures. These methods comprise: (a) placing a wall structure proximate to a robotic arm, the wall structure comprising: (1) a frame comprising a first member, a second member that is spaced apart from the first member, and connecting members extending between the first member and the second member, wherein a front surface of the first member, a front surface of the second member, and a front surface of the connecting members form a front frame surface; and (2) a panel attached to the front frame surface so that the panel, the first member, the second member, and the connecting members define a cavity, wherein the robotic arm comprises: (1) a spray nozzle, and (2) an imaging device; (b) orienting the imaging device so that the imaging device faces the cavity; (c) surveying the cavity using the imaging device; (d) determining a spray foaming pattern to fill the cavity to a selected depth with a foam layer; (e) orienting the spray nozzle so the spray nozzle faces the cavity; (f) spray-applying a foam-forming composition into the cavity according to the spray foaming pattern by passing the foam-forming composition through the spray nozzle to form the foam layer; (g) orienting the imaging device so that the imaging device faces an open cavity of the wall structure in which a foam layer has been deposited; and (h) surveying the foam layer with the imaging device.

In still other respects, the specification relates to foam wall structure manufacturing systems. These systems comprise: (a) a conveyor configured to place a wall structure proximate to a robotic arm in a substantially horizontal orientation, the wall structure comprising: (1) a frame comprising a first member, a second member that is spaced apart from the first member, and connecting members extending between the first member and the second member, wherein a front surface of the first member, a front surface of the second member, and a front surface of the connecting members form a front frame surface; and (2) a panel attached to the front frame surface so that the panel, the first member, the second member, and the connecting members define an open cavity; (b) a robotic arm comprising: (1) a spray nozzle configured to be capable of facing the cavity, and (2) an imaging device configured to capable of facing the cavity; and (c) a source of foam-forming composition components in fluid communication with the spray nozzle.

The present specification also relates, among other things, wall structures made by the foregoing methods and using the foregoing systems, as well as to buildings comprising such wall structures.

BRIEF DESCRIPTION OF THE DRAWINGS

Various features and characteristics of the inventions described in this specification may be better understood by reference to the accompanying figures, in which.

Figure 1:
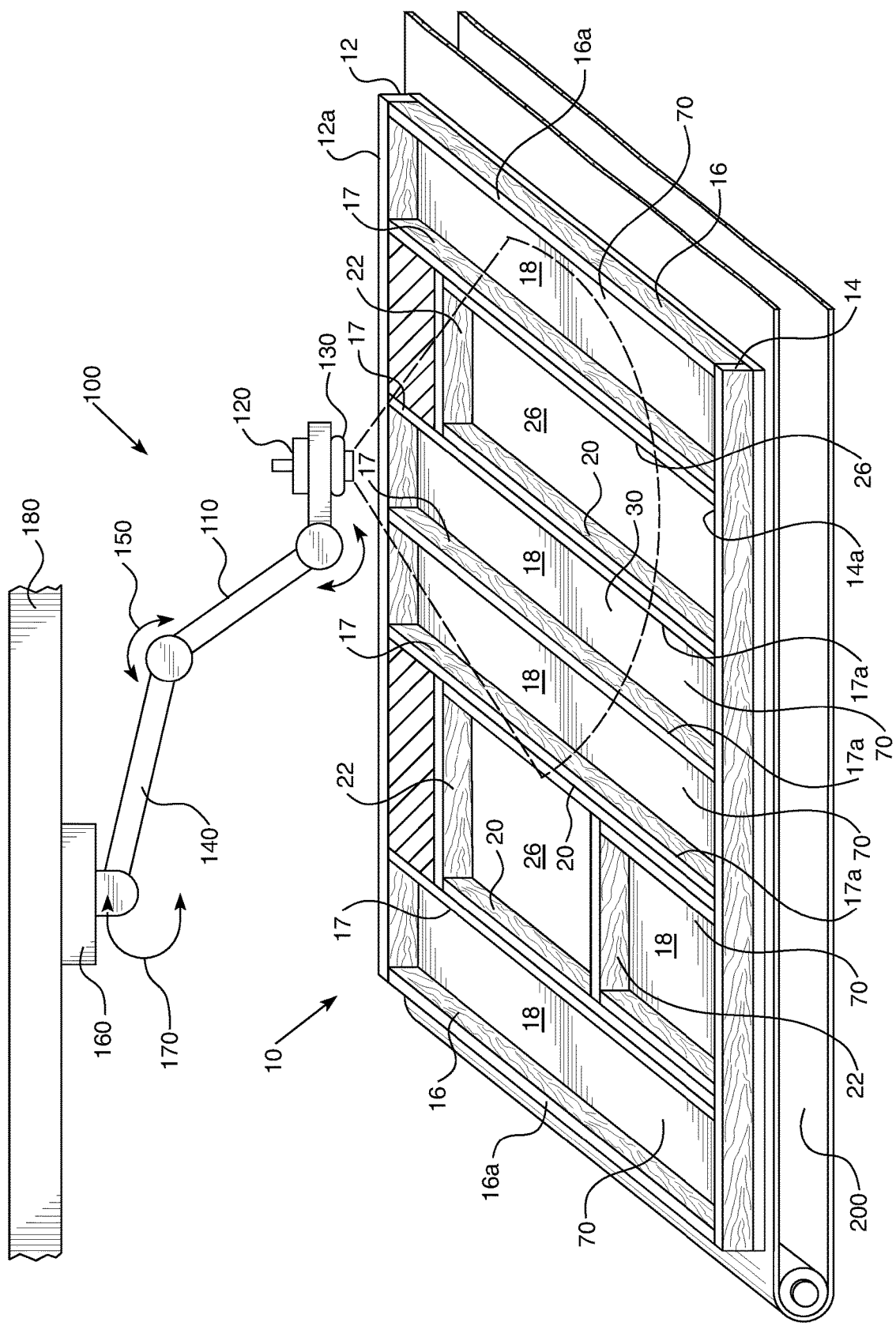
FIG. 1 is a perspective illustration of a wall structure placed proximate to a robotic arm that comprises an imaging device, in which the imaging device is surveying the cavities of the wall structure prior to spray-applying a foam-forming composition into the cavities, according to some aspects of the methods of this specification.

The reader will appreciate the foregoing features and characteristics, as well as others, upon considering the following detailed description of the inventions according to this specification.

DETAILED DESCRIPTION

As used in this specification, the term "front" refers to the side, face, or surface of a structure or component oriented towards the outside direction of an exterior wall of a building, and the term "rear" refers to the side, face, or surface of a structure or component oriented towards the inside direction of an exterior wall of a building.

As indicated, this specification relates to methods for manufacturing foam wall structures. A suitable wall structure for manufacture according to embodiments of the methods of this specification is illustrated in the Figures, particularly FIGS. 1-3, to which reference will now be made. As is apparent, a wall structure 10 comprises frame. The frame comprises a first member 12, a second member 14 spaced apart from the first member 12, and connecting members (such as the two side members and primary support member) 16, 17 extending between the first member 12 and the second member 14. As used herein, the term "connecting member" refers to a member that connects first member 12 with second member 14 and includes side members 16 and primary support members 17. The first member 12, the second member 14, and the connecting members 16, 17 each comprise a front surface and a rear surface that collectively form a front frame surface and a rear frame surface. The constituent members (12, 14, 16, and 17) of the frame can be made out of a suitable material of construction, such as wood. For example, the constituent members (12, 14, 16 and 17) of the frame can comprise wooden 2×4 members (i.e., structural members made of wood having nominal thicknesses of about 2-inches, nominal widths of about 4-inches, and suitable lengths) secured together with fasteners such as nails, nail plates, screws, staples, bolts, or rivets, or a combination of any thereof.

In some implementations, if desired, a mesh 90 (see FIG. 5) may lie adjacent to the front frame surface and be fastened to the front frame surface. In other embodiments, however, no such mesh is present.

In addition to lying adjacent to the front frame surface, the mesh 90 may also abut the front frame surface. As used herein, "abut", when used with reference to the mesh 90 abutting the front frame surface, means that the mesh 90 touches the front frame surface so that the mesh is not spaced apart from the front frame surface.

As used in this specification, the term "mesh" refers to an element that has a network structure comprising a plurality interlacing solid parts with regularly spaced apertures. Meshes suitable for use herein include those made of a metal or alloy, nylon or another thermoset polymer, a thermoplastic polymer such as polyethylene, an organic or inorganic woven or non-woven material, or any material capable of operating as a screen, i.e., of sufficient porosity, whereby some of the foam layer (described below) penetrates through the apertures of the mesh.

In some implementations, the mesh 90 comprises an expanded metal (such as carbon steel, galvanized steel, stainless steel, aluminum or another metal), metal wire cloth (either woven or welded wires made of carbon steel, galvanized steel, stainless steel, or another metal), glass fibers, or plastic, though other materials can be readily envisioned. The apertures may be, for example, of a square, diamond, rhombus, or hexagonal pattern. For example, in some implementations, the mesh 90 has a thickness of 0.005 to 1 inch (0.127 to 2.54 millimeters), such as 0.01 to 0.05 inch (0.254 to 1.27 millimeters) or 0.01 to 0.025 inch (0.254 to 0.635 millimeters). The apertures of mesh 90, in some implementations, have a size of 0.25 to 1 inch (6.35 to 25.4 millimeters), such as 0.25 to 0.75 inch (6.35 to 19.05 millimeters) in the longest-dimension thereof. Thus, as will be appreciated, in some implementations, the width and/or height of the apertures of the mesh are larger than the thickness of the mesh.

The mesh 90 can be fastened to the front frame surface. The mesh can be fastened to any of the front faces of the constituent members (12, 14, 16 and 17) of the frame. For example, the mesh 90 can be fastened to the front faces of the first and second members 12 and 14 and/or to the front faces of the connecting members 16, 17 extending therebetween. The mesh 90 can be attached to the front frame surface with mechanical fasteners 92 (see FIG. 5) and/or an adhesive. Attachment mechanical fasteners can include, but are not limited to, nails, staples, screws, bolts, or rivets, or a combination of any thereof. Attachment adhesives can comprise a construction adhesive that is compatible with the adjoining materials. For example, an adhesive used to attach a mesh 90 to the front frame surface can comprise a foam material (which may be the same foam material or a different foam material as the foam material comprising the foam layer, described below).

According to the wall structures manufactured by the methods of this specification, a panel 70 is attached to the front frame surface. The panel 70 may also abut the mesh 90, when the mesh 90 is present. As used herein, "abut", when used with reference to the panel 70 "abutting" the mesh 90, means that the panel 70 touches the mesh so that the panel 70 is not spaced apart from the mesh 90.

In some implementations, panel 70 is a foam panel, though other panels, such as wood panels, plywood panels, and OSB panels can be readily envisioned. As used in this specification, the term "foam panel" refers to panels comprising foam, such as, for example, polyisocyanurate (sometimes referred to as "polyiso") foam and polystyrene foam, such as expanded and extruded polystyrene foam. As will be appreciated, such foam panels have relatively low fastener pull-out strength as compared to wood panels, plywood panels, and OSBs. Accordingly, "foam panel" as used in this specification, is to be distinguished from wood panels, plywood panels, and OSBs, for example. As used herein, "foam" refers to a substance that is formed by trapping pockets of gas in a liquid or solid. In certain embodiments, the foams described in this specification are "closed-celled" foams. The term "closed-celled foam", as used in this specification, means that the foam has a closed cell content of at least 80%, sometimes at least 90%, when measured according to ASTM D6226-15, which is incorporated herein by reference. In certain embodiments, the foams described in this specification are "rigid" foams. The term "rigid foam" refers to a foam having a ratio of compressive strength to tensile strength of at least 0.5:1, elongation of less than 10%, and a low recovery rate from distortion and a low elastic limit, as described in "Polyurethanes: Chemistry and Technology, Part II Technology," J. H. Saunders & K. C. Frisch, Interscience Publishers, 1964, page 239, which is incorporated herein by reference. The term "panel", as used herein, refers to a solid, relatively thin and flat slab of material, which in some cases, has a rectangular or square shape. In some embodiments, the foam panels described herein have a thickness of no more than 2 inches (5.08 cm), such as a thickness of 1 to 2 inches (2.54 to 5.08 cm) or 1 to 1.5 inches (2.54 cm to 3.81 cm).

In some implementations, panel 70, particularly in the case of a foam panel, that is attached to the front frame surface comprises a facer on a rear face and/or a front face of a core foam layer. For example, the foam panel 70 may comprise a polyiso panel comprising a polyisocyanurate foam core layer and a facer attached to a front face and/or a rear face of the polyisocyanurate foam core layer. In certain implementations, the facer is attached to and substantially covers both sides (the front and rear faces) of a polyisocyanurate foam core layer or other foam core layer. For example, facers can comprise glass mats filled with recycled cardpanel and colored with carbon black. Facers can also comprise foil or foil/glass composites. Facers can also comprise fibrous materials such as fiberglass materials or other fiber-reinforced sheet-like materials. Examples of suitable facers include, but are not limited to, fiberglass mats, glass fiber-reinforced cellulosic felts, coated and polymer-bonded fiber mats (e.g., fibrous glass mats bonded with an organic polymer binder and coated with an organic polymer coating, clay, or other inorganic coating), foils (e.g., aluminum foil), coated foils, foil/membrane laminates, foil/glass composites, and polyolefin films (such as TYVEK® materials, available from DuPont; or TYPAR® materials, available from Fiberweb, Inc.). If a polyiso panel or other type of foam panel comprises a facer on both the front and rear faces of the polyisocyanurate foam layer or other core layer, then the facer on the front face may be the same as or may be different than the facer on the rear face. In some implementations, the facer acts as a water-resistant barrier. In some implementations, the facer meets the requirements as described in ASTM D226/D226M-09: Standard Specification for Asphalt-Saturated Organic Felt Used in Roofing and Waterproofing; or ASTM E2556/E2556M-10: Standard Specification for Vapor Permeable Flexible Sheet Water-Resistive Barriers Intended for Mechanical Attachment; or otherwise qualifies as a water-resistive barrier in accordance with International Residential Code (IRC) 703.2 (2012), which are each incorporated by reference into this specification. For embodiments in which the foam panel comprises a polyiso panel, the foam panel may meet the requirements of ASTM C1289-15: Standard Specification for Faced Rigid Cellular Polyisocyanurate Thermal Insulation Panel, which is incorporated by reference into this specification.

In the wall structure 10 depicted in the Figures, panel 70 is fastened to the front frame surface. The panel 70 can be fastened to any of the front faces of the constituent members (12, 14, 16 and 17) of the frame. For example, panel 70 can be attached to the front faces of the first and second members 12 and 14 and to the front faces of the connecting members 16, 17 extending therebetween. Panel 70 can be attached to the front frame surface with fasteners and/or an adhesive (not shown). Suitable mechanical fasteners can include, but are not limited to, nails, staples, screws, bolts, or rivets, or a combination of any thereof. Attachment adhesives can comprise a construction adhesive that is compatible with the adjoining materials. For example, an adhesive used to fasten a panel 70 to a frame can comprise a foam material (which may be the same foam material or a different foam material as the foam material comprising the foam layer, described below).

Figure 2:
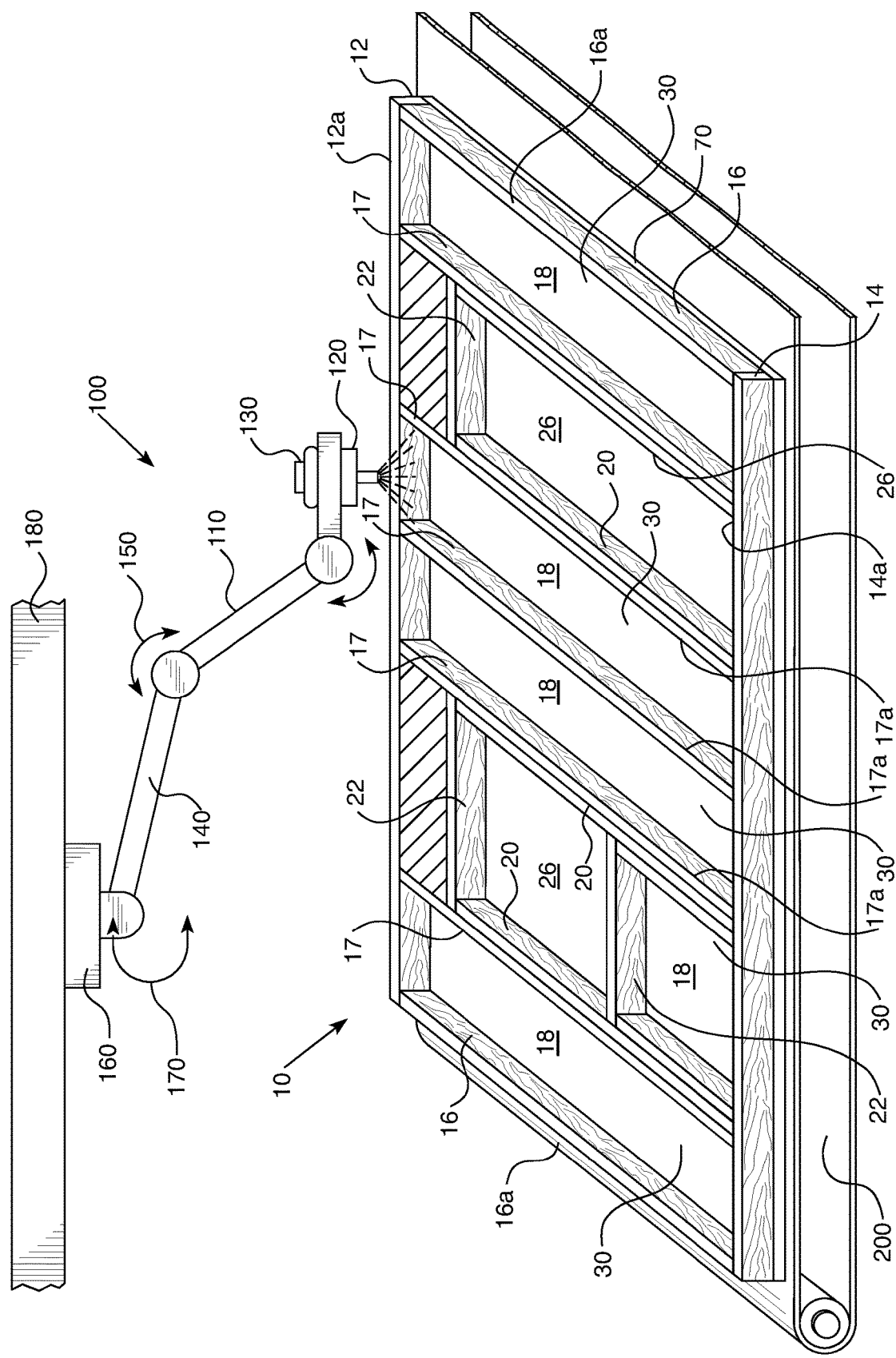
FIG. 2 is a perspective illustration of a wall structure placed proximate to a robotic arm that comprises a spray nozzle, in which a foam-forming composition is being spray applied into cavities of the wall structure by passing the foam-forming composition through the spray nozzle, according to some aspects of the methods of this specification.
Figure 3:
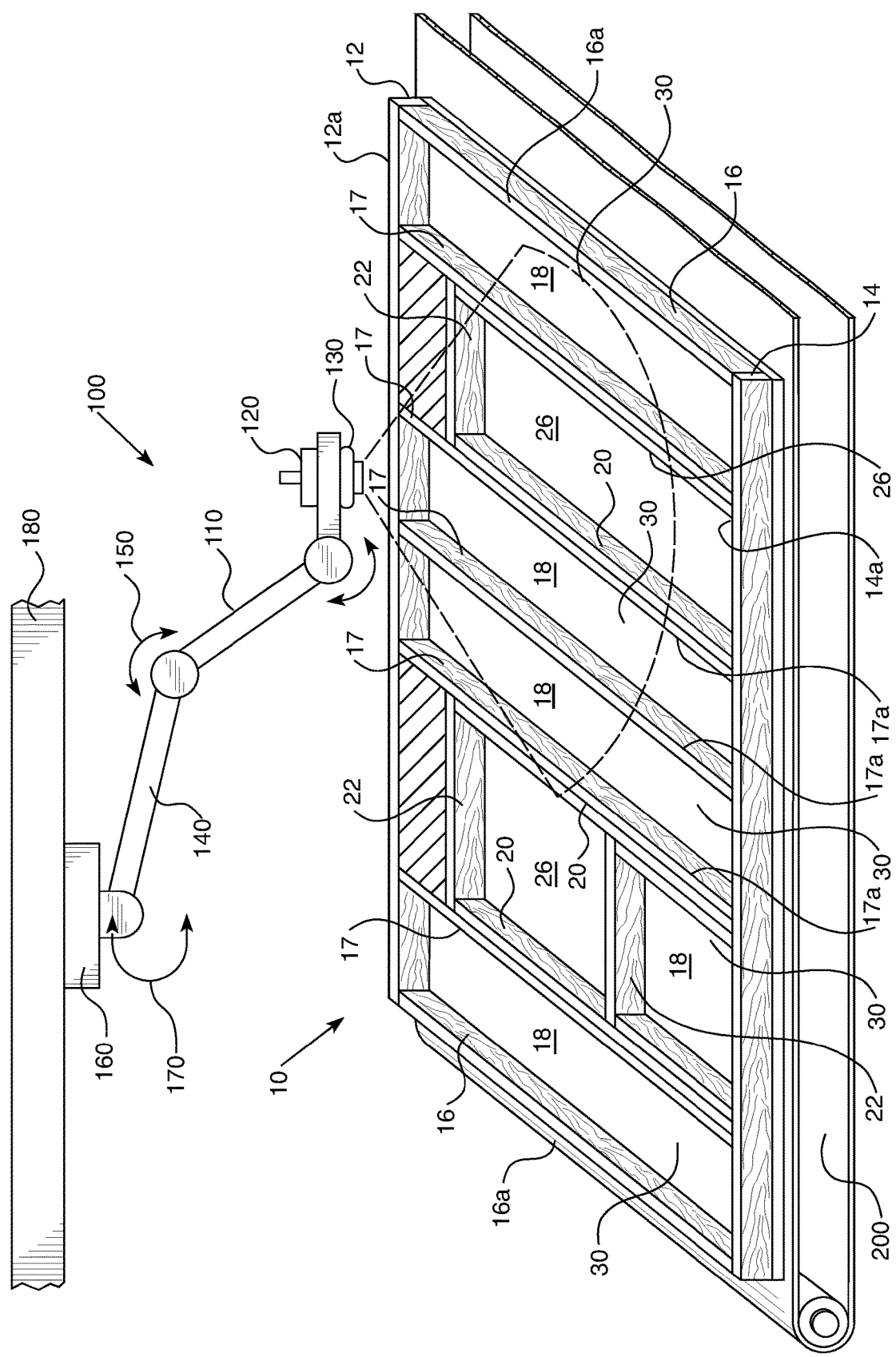
FIG. 3 is a perspective illustration of a wall structure placed proximate to a robotic arm that comprises an imaging device, in which the imaging device is surveying the cavities of the wall structure after a foam layer has been deposited into cavities of the wall structure, according to some aspects of the methods of this specification
Figure 4:
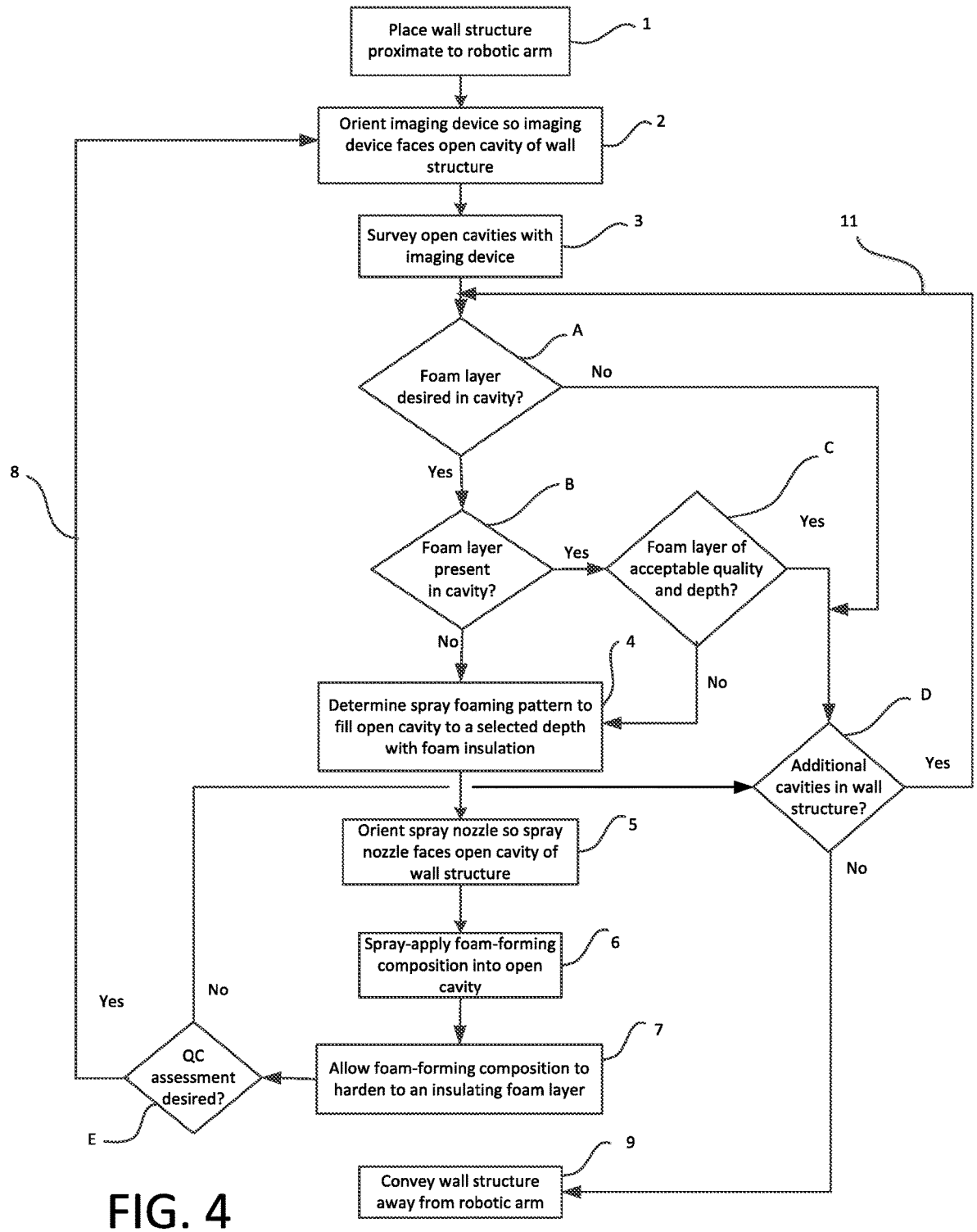
FIG. 4 is a flow diagram illustrating some implementations of the methods of this specification.

The methods of this specification will now further be described with additional reference to FIG. 4. As is apparent, according to these methods, a wall structure is placed proximate to a robotic arm (step 1 in FIG. 4). As seen in FIGS. 1-3, in some implementations, wall structure 10 may be placed proximate to robot 100 by conveying the wall structure 10, in either a continuous or a discontinuous manner, using any suitable conveyor 200, such as, for example, a belt conveyor, a roller conveyor, a slat conveyor, or a chain conveyor, any of which can be motorized or not motorized and any of which can be floor or overhead mounted. Other suitable overhead conveyors include hand push beam trolley systems, monorails (trolleys connected together with a chain), power and free conveyors, over under conveyors, inverted monorails, and inverted power and free conveyors.

In some implementations, however, conveyor 200 is configured to convey wall structure 10 so that it is placed proximate to robot 100 in a substantially horizontal orientation. As used herein, the phrase "substantially horizontal orientation" when used with reference to positioning of the wall structure 10, means that the wall structure 10 is positioned so that the longest dimension of at least one of the frame members 12, 14, 16, and 17, in some cases frame member 16 and 17, is generally horizontally oriented, but may not be exactly horizontal. For example, deviations from true horizontal of up 20°, such as up to 10°, may be tolerated in some implementations. In some implementations, as is best seen in FIG. 1, the panel 70 may rest against conveyor 200, such that the rear surfaces 12a, 14a, 16a and 17a of constituent members 12, 14, 16, and 17 are exposed to robotic arm 110, as is the rear surface of panel 70.

Still referring to FIGS. 1-3, it is seen that, in some implementations, robot 100 comprises robotic arm 110. Robotic arm 110 may comprise a spray nozzle 120 attached thereto, such as at a side thereof, and an imaging device 130 attached thereto, such as at a side thereof. In one implementation, spray nozzle 120 is mounted to robotic arm 110 on one side of robotic arm 110 and imaging device 130 is mounted to robotic arm 110 on an opposite side of robotic arm 110.

In the particular implementation depicted in FIGS. 1-3, robot 100 further comprises rear robotic arm 140 hinged to robotic arm 110 about an axis 150, such that robotic arm 110 extends downwardly with respect to rear robotic arm 140 and towards the wall structure 10. Rear robotic arm 140 may extend as a cantilever from a base 160 may be rotatable about axis 170, base 160 being mounted onto beam 180. In some implementation, such as is shown in FIGS. 1-3, beam 180 is configured to suspend robot 100 over conveyor 200. In another possible embodiment, however, base 160 may rest on a platform (see FIG. 6). The platform may be embodied as a bridge comprising legs that are configured such that the wall structure 10 may be conveyed in a substantially horizontal orientation under the bridge between the legs thereof.

According to the methods of this specification, imaging device 130 is oriented so that imaging device 130 faces cavities 18, 26 of wall structure 10 (step 2 in FIG. 4). This may be accomplished, for example, by orienting robotic arm 110 in a manner such that imaging device 130 faces cavities 18, 26. Imaging device 130 may be rotatably mounted, such as via a swivel joint, a ball joint, or a U-joint, to robotic arm 110 so that imaging device 130 can swivel in any direction relative to the position and orientation of wall structure 10, thereby allowing imaging device 130 to survey all surfaces of cavity 18, including generally horizontally and generally vertically arranged surfaces, including an exposed rear surface of panel 70. Thus, in certain implementations, cavity 18 is an open cavity in which the rear frame surface (which is made up of the rear surfaces, 12a, 14a, 16a, 17a of constituent frame members 12, 14, 16, 17) is not covered, such as with any type of sheathing. In some implementations, such as is depicted in FIGS. 1-3, robotic arm 110 is oriented in a downward direction towards underlying open cavities 18, 26 of the wall structure 10 as the wall structure 10 is conveyed on conveyor 200.

Any of a variety of imaging devices 130 are suitable for use in the methods and systems of this specification so long as the device is capable of surveying dimensions and the position of cavities 18, 26 of wall structure 10. In some implementations, the imaging device 130 is a camera, i.e., an image recorder, such as any analog camera, digital camera, thermal imaging camera, motion camera, or an acoustic camera.

According to the methods of this specification, the imaging device 130 is oriented so that the imaging device 130 faces cavities 18, 26 and the imaging device 130 surveys the cavities 18, 26 (step 3 in FIG. 4). The imaging device 130 surveys cavities 18, 26, examining the dimensions thereof, i.e., length, width, and depth, and also examines the position of the cavities 18, 26 relative to the position of the robotic arm 110.

Based on the image(s) produced by imaging device 130 a determination can made as to which cavities 18, 26 in a wall structure 10 are those for which a foam layer is desired (step A in FIG. 4). In some implementations, the wall structure 10 may include one or more cavities 18, 26 for which no foam layer is desired. Examples of this situation can be illustrated by reference to FIGS. 1-3 which illustrate cavities 26 which embody a window opening and a door opening. Here, it may be desired not to form a foam layer 30 in cavities 26, but to form a foam layer 30 in cavities 18. In some implementations, wall structure 10 may include a visual marking or other indicia in any cavities for which a foam layer 30 is not desired. Robot 100 may itself include or it may be in communication with a computing device that may contain software code for instructing robot 100 not to spray a foam-forming composition into any cavities of wall structure 10 that contain such a visual marking or other indicia, though other means of making such a determination can be readily envisioned. Of course, such a determination can also be made manually by a human being. In the case that a surveyed cavity is one for which a foam layer 30 is not desired as determined, for example, by the presence of a visual marking indicating such, then, a determination may be made as to whether there are additional cavities in the wall structure (step D in FIG. 4).

Furthermore, based on the image(s) produced by imaging device 130, a determination can made as to whether a foam layer 30 is present in an open cavity 18 (step B in FIG. 4). Such a determination can be made by a computing device that itself is a part of robot 100 or it may be a separate component that is in communication robot 100. The computing device may contain software code for instructing robot 100 on how to assess whether a foam layer 30 is present, including evaluating the thickness and quality thereof, as described in more detail below. Of course, such a determination can also be made manually by a human being, if desired.

If it is determined that no foam layer 30 is present in the cavity 18, then, according to the methods of this specification, a spray foaming pattern to fill the cavity to a selected depth is determined (step 4 in FIG. 4). For example, in some implementations, robot 100 may itself include or it may be in communication with a computing device that receives data from imaging device 130 when imaging device 130 surveys a cavity of wall structure 10 and may include software code for determining, based on data received from imaging device 130, the amount of foam-forming composition components to add to achieve a require thickness for foam layer 30 for the cavity 18 and for determining an ideal spray pattern to minimize variations in the depth of foam layer 30 in cavity 18. In addition, the computing device may retrieve quality data for wall structure 10, which may be present in a database, and which may include (but is not limited to) data with respect to required average thickness of foam layer 30 and/or maximum deviations allowed from a target thickness in foam layer 30 in any one location. Of course, if desired, relevant quality data could be manually entered to the computing device by a human being.

In some implementations, for example, it may be desirable that the spray foaming pattern include first forming a "picture frame" layer of foam as a first foam layer in which the picture frame is in contact with the constituent frame members 12, 14, 16, 17 and optionally also 20 and 22 if they are present. Then, the foam-forming composition is deposited into the cavity 18 such that a continuous foam layer 30 of a selected depth is formed within the cavity 18 between the front frame surface and the rear frame surface and adheres to the foam board 70.

Figure 5:
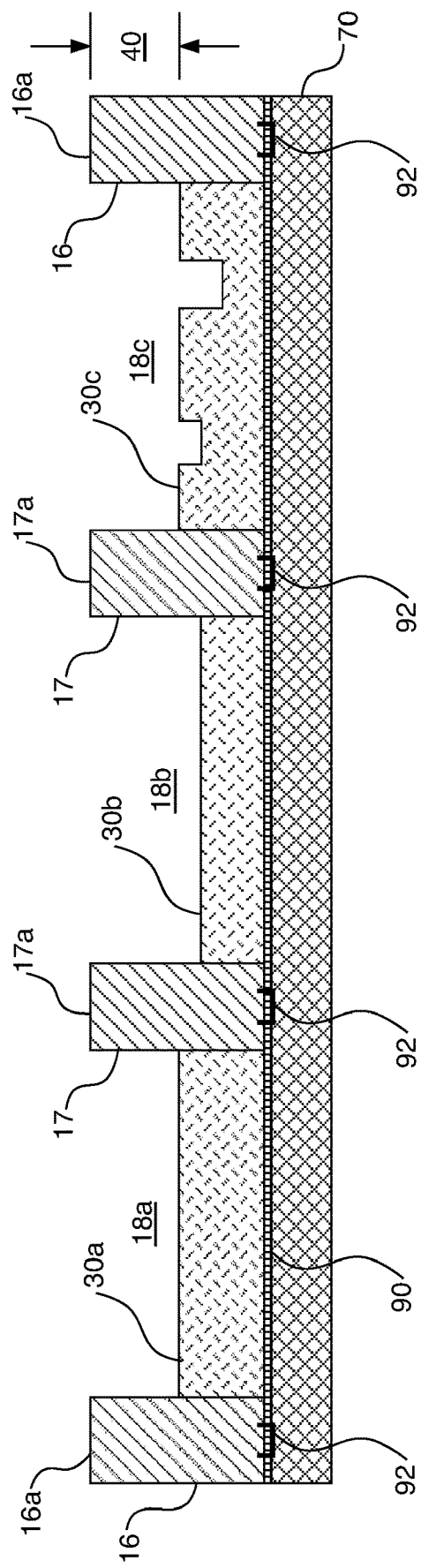
FIG. 5 is a side cross-sectional view of a wall structure according to some implementations of this specification.

The foam layer 30 can be dimensioned to expand to a position intermediate the front frame surface and rear frame surface, thereby forming a gap or opening 40 within the foam wall structure 10 between the foam layer 30 and the rear frame surface. Such a gap is best illustrated in FIG. 5. For example, in some implementations, the selected depth of the foam layer 30 will be 1 to 1½ inches. This gap 40 can be used as an area to incorporate home utility components such as electrical wires, cords, heating and cooling pipes, and plumbing fixtures. These home utility components may be inserted into the gap 40 located between the foam layer 30 and the rear frame surface such that utilities components are not surrounded or contacting the foam layer 30, in certain embodiments, the gap 40 comprises at least two inches as measured between the rear surface of the foam layer and the rear frame surface.

In certain embodiments, the spray foaming pattern may include allowing some portions of wall structure 10 to be free of a foam layer 30. As shown in FIGS. 1-3, for example, secondary support members 20 and/or tertiary support members 22 may be present in wall structure 10 to form secondary cavities 26. These secondary cavities 26 can be free of foam. For example, in some embodiments, the foam layer 30 does not extend beyond and over the front secondary support surfaces of the secondary members 20, the front tertiary support surfaces of the tertiary support members 22, and/or beyond and over at least a portion of the front surfaces of other members that help form the secondary cavity 26. In such cases, corresponding openings are often present in the panel 70.

According to the methods of this specification, as illustrated in FIG. 2, the spray nozzle 120 is oriented so spray nozzle 120 faces an open cavity 18 of wall structure 10 and a foam-forming composition is spray-applied into the cavity 18 according to the spray foaming pattern by passing the foam-forming composition through the spray nozzle, thereby forming foam layer 30 in cavity 18 (steps 5 and 6 in FIG. 4). Orientation of the spray nozzle so that the spray nozzle 120 faces open cavity 18 of wall structure 10 can be accomplished, for example, by orienting robotic arm 110 in a manner such that spray nozzle 120 faces cavity 18. Similar to what was described earlier with respect to the imaging device 130, spray nozzle 120 may be rotatably mounted, such as via a swivel joint, a ball joint, or a U-joint, to robotic arm 110 so that spray nozzle 120 can swivel in any direction relative to the position and orientation of wall structure 10, thereby allowing the spray nozzle 120 to spray apply a foam-forming composition at all surfaces of cavity 18, including generally horizontally and generally vertically arranged surfaces, including an exposed rear surface of panel 70.

As should be evident, the methods of this specification contemplate formation of foam layer 30 in-situ during the manufacturing process. This means that foam layer 30 is created during manufacturing of the foam wall structure 10 off-site at a facility remote or away from a building construction site. As such, the foam layer 30 may be formed not at a construction site as has historically been required.

The foam layer 30 can comprise, for example, polyurethane, polyurea, or polyisocyanurate, or a mixture thereof. The foam layer 30 can be substantially free, essentially free, or completely free of halogen-containing flame retardant additives.

Examples of foam materials include, but are not limited to, foams made with polyurethane, polyurea, polyisocyanurate (also referred to as polyiso), and mixtures thereof. Foam materials (including the foam layer 30) may be substantially free, may be essentially free, or may be completely free of halogen-containing flame retardant additives. The term "halogen" refers to the halogen elements, which include fluorine, chlorine, bromine, and iodine, and the term "halogen-containing flame retardant additives" refers to a substance that may be used to inhibit or resist the spread of fire, and which contains halogen groups such as a fluoro, chloro, bromo, and/or iodo groups. Further, the term "substantially free," as used in this specification, means the foam material contains less than 1000 parts per million (ppm), "essentially free" means less than 100 ppm, and "completely free" means less than 20 parts per billion (ppb) of halogen-containing flame retardant additives.

In certain embodiments, the foam layer 30 has a relatively high density. More particularly, in certain embodiments, the density of the foam layer 30 is at least 2.8 lb/ft$^3$ (44.9 kg/m$^3$), such as 2.8 to 4.0 lb/ft$^3$ (44.9 to 64.1 kg/m3), or, in some cases, 3.0 to 4.0 lb/ft$^3$ (48.1 to 64.1 kg/m$^3$) or 3.2 to 3.8 lb/ft$^3$ (51.3 to 60.9 kg/m$^3$) or 3.4 to 3.8 lb/ft$^3$ (54.5 to 60.9 kg/m$^3$), when measured according to ASTM D1622-08.

As illustrated in FIGS. 1-3 and 5, foam layer 30 may comprise a thickness extending from the rear surface of the foam panel 70 to a position intermediate the front frame surface and the rear frame surface. In this manner, a gap 40 (see FIG. 5) may be formed within the frame between a rear surface of the foam layer 30 and the rear frame surface. Although the Figures show the foam layer 30 comprising a thickness extending from the rear surface of the foam panel 70 to a position intermediate the front frame surface and the rear frame surface, it should be understood that the foam layer 30 can alternatively comprise a thickness extending from the rear surface of the foam panel 70 to the rear frame surface, in which case there may be no gap formed within the frame between the rear surface of the foam layer 30 and the rear frame surface. In some embodiments, gap 40 has a width, from the rear surface of the foam layer to the rear frame surface, of at least 1 inch (2.54 cm), such as 1 to 2 inches (2.54 to 5.08 cm) or 1.5 to 2 inches (3.81 to 5.08 cm).

As will be appreciated, in the case of a polyurethane foam, foam layer 30 can be a reaction product produced from a foam-forming composition that includes: (a) a diisocyanate and/or polyisocyanate (collectively "polyisocyanate"); and (b) an isocyanate-reactive composition.

Any of the known organic isocyanates, modified isocyanates or isocyanate-terminated prepolymers made from any of the known organic isocyanates may be used. Suitable organic isocyanates include aromatic, aliphatic, and cycloaliphatic polyisocyanates and combinations thereof. Useful isocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclo-hexane diisocyanate, isomers of hexahydro-toluene diisocyanate, isophorone diisocyanate, dicyclo-hexylmethane diisocyanates, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyl-diphenyl-propane-4,4'-diisocyanate; triisocyanates such as 2,4,6-toluene triisocyanate; and polyisocyanates such as 4,4'-dimethyl-diphenylmethane-2,2',5,5'-tetraisocyanate and the polymethylene polyphenyl-polyisocyanates.

Undistilled or crude polyisocyanates may also be used. The crude toluene diisocyanate obtained by phosgenating a mixture of toluene diamines and the crude diphenylmethane diisocyanate obtained by phosgenating crude diphenylmethanediamine (polymeric MDI) are examples of suitable crude polyisocyanates. Suitable undistilled or crude polyisocyanates are disclosed in U.S. Pat. No. 3,215,652.

Modified isocyanates are obtained by chemical reaction of diisocyanates and/or polyisocyanates. Useful modified isocyanates include, but are not limited to, those containing ester groups, urea groups, biuret groups, allophanate groups, carbodiimide groups, isocyanurate groups, uretdione groups and/or urethane groups. Examples of modified isocyanates include prepolymers containing NCO groups and having an NCO content of from 25 to 35 weight percent, such as from 29 to 34 weight percent, such as those based on polyether polyols or polyester polyols and diphenylmethane diisocyanate.

In certain implementations, the polyisocyanate comprises a methylene-bridged polyphenyl polyisocyanate and/or a prepolymer of methylene-bridged polyphenyl polyisocyanates having an average functionality of from 1.8 to 3.5, such as from 2.0 to 3.1, isocyanate moieties per molecule and an NCO content of from 25 to 32 weight percent, due to their ability to cross-link the polyurethane.

The isocyanate-reactive composition usually comprises a polyol, such as a polyether polyol and/or polyester polyol. Polyether polyols are usually prepared by reacting at least one alkylene oxide with one or more suitable H-functional starter compounds in the presence of a suitable catalyst. Examples of suitable alkylene oxides include ethylene oxide, propylene oxide, butylene oxide, styrene oxide, epichlorohydrin, or a mixture of any two or more thereof. Some examples of suitable H-functional starters are saccharides, such as sucrose, sorbitol, maltitol, etc. as well as other mono-saccharides, di-saccharides, tri-saccharides and poly-saccharides, water, propylene glycol, glycerin, ethylene glycol, amines, including aromatic amines (such as 2,3-toluene diamine, 3,4-toluene diamine, 2,4-toluene diamine, and/or 2,6-toluene diamine) and aliphatic amines, ethanol amines, diethylene glycol, or a mixture of any two or more thereof. Some examples of suitable catalysts which can be used include basic catalysts (such as sodium or potassium hydroxide or tertiary amines such as methyl imidazole) and double metal cyanide (DMC) catalysts.

Polyester polyols are usually the reaction product of an acid (often an aromatic diacid) or anhydride with a suitable glycol and/or triol. For example, polyester polyols can be the reaction product of a glycol and/or triol, such as ethylene glycol, propylene glycol, butylene glycol, 1,3-butanediol, neopentyl glycol, diethylene glycol, dipropylene glycol, triethylene glycol, tripropylene glycol, glycerol, trimethylolethane, trimethyolpropane, pentanediol, hexanediol, heptanediol, 1,3- and 1,4-dimethylol cyclohexane, or a mixture of any two or more thereof with an aromatic diacid or aromatic anhydride, such as, for example, phthalic acid, isophthalic acid, terephthalic acid, or phthalic anhydride.

The isocyanate-reactive composition often further comprises one or more blowing agents. Suitable blowing agents include physical blowing agents and carbon dioxide generating chemical blowing agents.

Suitable physical blowing agents include, without limitation, hydrochlorofluoroolefins ("HCFOs"), such as 1-chloro-3,3,3-trifluoropropene (HCFO-1233zd, E and/or Z isomers), 2-chloro-3,3,3-trifluoropropene (HCFO-1233xf), HCFO1223, 1,2-dichloro-1,2-difluoroethene (E and/or Z isomers), 3,3-dichloro-3-fluoropropene, 2-chloro-1,1,1,4,4,4-hexafluorobutene-2 (E and/or Z isomers), 2-chloro-1,1,1,3,4,4,4-heptafluorobutene-2 (E and/or Z isomers); hydrofluoroolefins (HFOs), such as pentafluoropropane, tetrafluoropropene, 2,3,3,3-tetrafluoropropene, 1,2,3,3-tetrafluoropropene, trifluoropropene, tetrafluorobutene, pentafluorobutene, hexafluorobutene, heptafluorobutene, heptafluoropentene, octafluoropentene, and nonafluoropentene; chlorofluorocarbons ("CFCs"); hydrogen-containing chlorofluorocarbons ("HCFCs"); hydrofluorocarbons ("HFCs"); and hydrocarbon blowing agents, such as butane, n-pentane, cyclopentane, hexane, and/or isopentane (i.e. 2-methylbutane); hydrofluoroethers ("HFEs"); $C_1$ to $C_5$ alcohols, $C_1$ to $C_4$ aldehydes, $C_1$ to $C_4$ ketones, $C_1$ to $C_4$ ethers and diethers and carbon dioxide.

Suitable carbon dioxide generating chemical blowing agents include water and formate-blocked amines.

In some implementations, the isocyanate-reactive composition also comprises a surfactant. Any suitable surfactant can be used, including organosilicon compounds, such as polysiloxane-polyalkyene-block copolymers, such as a polyether-modified polysiloxane. Other useful surfactants include polyethylene glycol ethers of long chain alcohols, tertiary amine or alkanolamine salts of long chain alkyl acid sulfate esters, alkylsulfonic esters, or alkylarylsulfonic acids.

The isocyanate-reactive composition often further comprises a catalyst composition. Suitable catalysts include, but are not limited to, tertiary amines, tertiary phosphines, metal chelates, acid metal salts, strong bases, various metal alcoholates and phenolates, and metal salts of organic acids. In some implementations, an organotin catalyst and/or tertiary amine catalyst is used. For example, in some cases, a combination of "blowing" catalyst, which promotes the reaction of an isocyanate group with a water molecule to form carbon dioxide, and a "gelling" catalyst, which strongly promotes the reaction of an alcohol group with an isocyanate to form the urethane, or a trimerization catalyst, may be used. Some specific examples of suitable tertiary amine catalysts include: pentamethyldiethylenetriamine, N,N-dimethylcyclohexylamine, N,N',N"-tris(3-dimethylaminopropyl-)hexahydrotriazine, tetramethylethylenediamine, tetraethylene diamine and benzyldimethylamine. In certain embodiments, useful tertiary amine catalysts include pentamethyldiethylenetriamine, N,N',N"-dimethylaminopropyl-hexahydrotriazine, and N,N-dimethylcyclohexylamine. Specific examples of suitable organometallic catalysts include dibutyltin dilaurate, dibutyltin diacetate, stannous octoate, potassium octoate, and potassium acetate.

Additional materials which may optionally be included in the isocyanate-reactive composition include: pigments, colorants, fillers, antioxidants, flame retardants, and stabilizers, among others.

To form polyurethane foam, the polyol(s) of the isocyanate-reactive composition is reacted with a polyisocyanate in the presence of the blowing agent composition, the catalyst composition, a surfactant and any other optional ingredients. In many cases, foam machines are designed to condition and mix only two components in the proper ratio. For use of these machines, a premix of all the components except the polyisocyanate can be advantageously employed.

Thus, in certain implementation of the methods of this specification, a polyisocyanate (component A) and an isocyanate-reactive composition which typically includes polyol, blowing agent, water, catalyst and surfactant (component B), are fed separately from their respective storage containers and are mixed with each other as they pass through the spray nozzle to form the foam-forming composition. Various spray application devices can be used to spray the foam composition into the cavity 18. It is often desirable that the polyisocyanate (component A) and isocyanate-reactive composition (component B) are metered and mixed in the spray nozzle at a 1:1 volume ratio.

Referring now once again to FIG. 4, in certain implementations of the methods of this specification, after allowing the foam-forming composition to harden to form foam layer 30 (step 7 in FIG. 4), wall structure 10 may be conveyed away from robotic arm 110 (step 9 in FIG. 4) if there are no additional cavities 18 in which a foam layer 30 is to be deposited, where it may proceed, for example, to a packaging and/or storage area. Alternatively, if there are additional cavities 18 in the wall structure in which it is desired to deposit a foam layer 30, the process may recycle directly to step A (arrow 11 in FIG. 4).

Still alternatively, in some implementations, it may be desirable to undertake an in-line quality control ("QC") assessment of foam layer 30 (step E of FIG. 4). Thus, in some cases, it may be desirable to once again (see arrow 8 in FIG. 4) orient imaging device 130 so that the imaging device 130 faces the open cavity 18 of the wall structure 10 (step 2 in FIG. 4). This allows imaging device 130 to once again survey open cavity 18 (step 3 in FIG. 4). This is illustrated in particular by FIG. 3. In this situation, based on the image(s) produced by imaging device 130 it would be determined that a foam layer 30 is present in the open cavity 18 (step B in FIG. 4). Then, it is possible to assess the quality and depth of foam layer 30 (step C in FIG. 4).

For example, referring now to FIG. 5 it is possible that foam layer 30 may, for example, have a consistency and depth that that is within a target range (such as 1½ inch thickness) that may be dictated by quality requirements for the wall structure 10. An example of such a foam layer 30 is foam layer 30a in cavity 18a of FIG. 5. Ultimately, when all cavities 18 in wall structure 10 contain a foam layer 30 that meets the targets for quality and thickness, the wall structure 10 may be conveyed away from robotic arm 110

(step 9 in FIG. 4), where it may proceed, for example, to a packaging and/or storage area.

On the other hand, it is possible that the assessment of foam layer 30 (step C in FIG. 4), reveals one or more deficiencies. For example, it may be determined that the average thickness of foam layer 30 is below a selected target thickness, resulting in a gap 40 having a width that is greater than desired. An example of this situation is illustrated by foam layer 30*b* in cavity 18*b* of FIG. 5. It is also possible that it may be determine that there are inconsistencies in the thickness of foam layer 30, such that the thickness of foam layer 30 deviates at one or more individual points from the selected target thickness. An example of this situation is illustrated by foam layer 30*c* in cavity 18*c* of FIG. 5. In either case, as illustrated by FIG. 4, according to the methods of this specification, a spray foaming pattern to fill the cavity to a selected depth is determined (step 4 in FIG. 4). Thereafter, steps 5-7 can be repeated.

The use of an imaging device and the ability to conduct such an in-line QC assessment can be an important aspect of the methods and systems of this specification. In many instances, such as in the case of forming a polyurethane foam layer 30, the foam-forming composition is not self-leveling. Rather, in some implementation, the foam-forming composition has a tack-free time of 30 seconds or less, which means that the composition usually hardens in the approximately the same location in which it is deposited into the open cavity. Therefore, it can be essential to understand the exact position of the open cavity relative to the location of the robotic arm as well as to understand the dimensions of the open cavity, via a visual image, in order to maximize the likelihood that a foam layer 30 of sufficient depth and quality is produced. Moreover, the ability to again visually survey the cavity once a foam layer 30 has been deposited, which can be accomplished very rapidly, ensures that production of poor quality product is minimal. Finally, by conducting a quality assurance check in-process very shortly after spray application, in-line corrective action can be implemented if needed, without significantly impacting productivity.

As may be apparent from the foregoing description, further aspects of this specification relate to foam wall structure manufacturing systems. An embodiment of such a system is illustrated by FIG. 6, to which reference will now be made.

As is apparent, system 1000 comprises conveyor 1010. Conveyor 1010, which may be any of the conveyor types mentioned earlier in this specification, such as a belt conveyor, a roller conveyor, a slat conveyor, or a chain conveyor, among others, is configured to place a wall structure 1020 proximate to a robotic arm 1030 of robot 1040 in a substantially horizontal orientation. Robotic arm 1030 comprise a spray nozzle 1050 attached thereto, such as at a side thereof, and an imaging device 1060 attached thereto, such as at a side thereof. Spray nozzle 1050 may be mounted to robotic arm 1030 via extension 1055 that extends radially from a side of robotic arm 1030 and imaging device 1060 may be mounted to robotic arm 1030 via extension 1065 that extends radially from an another side of robotic arm 1030. Spray nozzle 1050 and imaging device 1060 may be rotatably mounted to robotic arm 1030 or to extensions 1055 and 1065 respectively, such as via a swivel joint, a ball joint, or a U-joint.

Robot 1040 further comprises rear robotic arm 1070 hinged to robotic arm 1030 about an axis, such that robotic arm 1030 extends downwardly with respect to rear robotic arm 1070 and towards the wall structure 1020. Rear robotic arm may extend as a cantilever from base 1080, via robotic wrist 1090 wherein base 1080 may be rotatable and may be mounted onto platform 1100. In some implementations, such as is shown in FIG. 6, platform 1100 may be embodied as a bridge with legs that are configured such that wall structure 1020 may be conveyed in a substantially horizontal orientation under the platform 1100 between the legs thereof in the direction of the arrows in FIG. 6. In an alternate implementation, robot 1040 may be suspended over conveyor 1010 rather than resting on platform 1100 (such as is depicted in FIGS. 1-3).

Figure 6:
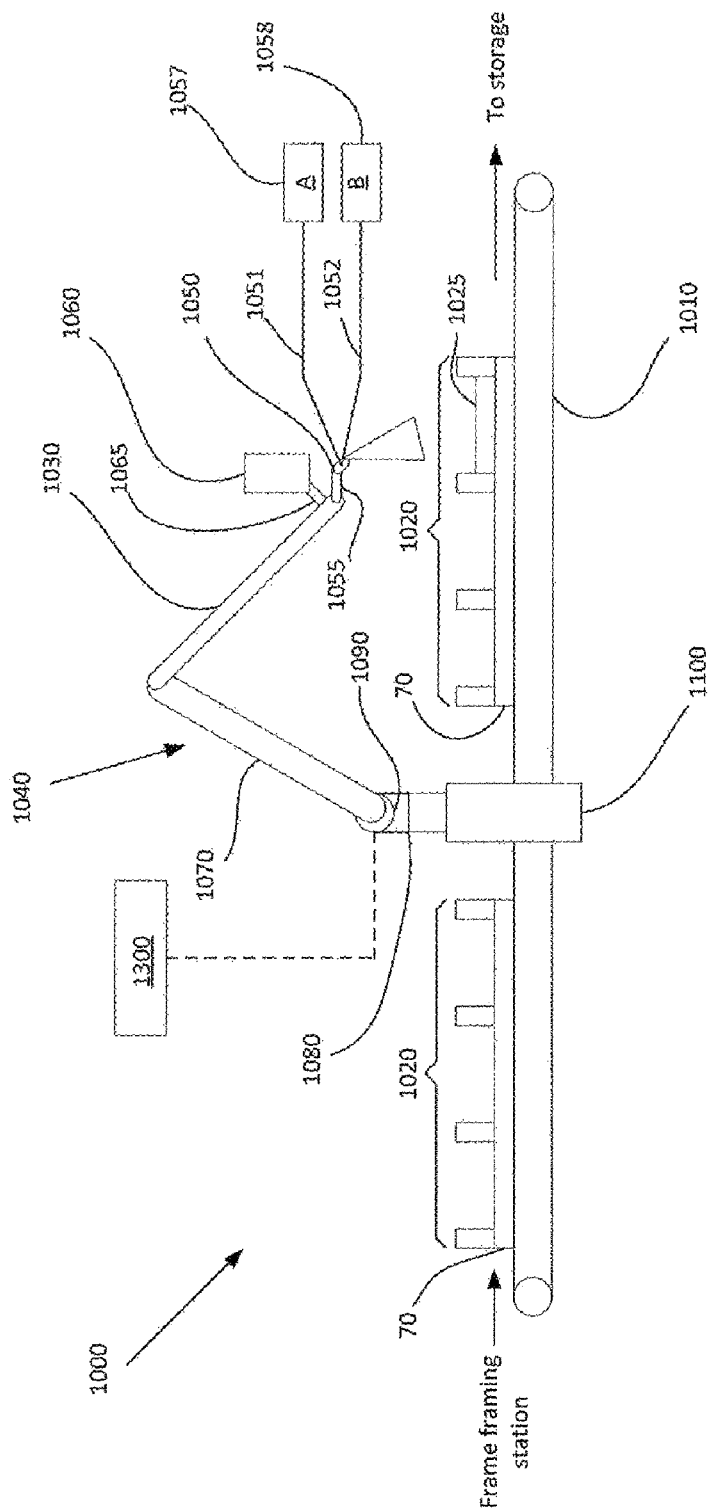
FIG. 6 is a schematic illustration of a wall structure manufacturing system, according to some aspects of this specification.

As shown in FIG. 6, conveyor 1010 is configured to place wall structure 1020 proximate to robotic arm 1040 in a substantially horizontal orientation where the front surface of panel 70 rests on conveyor 1010. As discussed earlier, wall structure 1020 comprises a frame comprising a first member, a second member that is spaced apart from the first member, and connecting members extending between the first member and the second member, wherein a front surface of the first member, a front surface of the second member, and a front surface of the connecting members form a front frame surface; and (2) a panel attached to the front frame surface so that the panel, the first member, the second member, and the connecting members define one or more open cavities. Robotic arm 1030 is configured to face the open cavity of the wall structure 1020, including the exposed rear surface of panel 70.

One or more sources of foam-forming composition components is in fluid communication with the spray nozzle 1050. For example, as illustrated in FIG. 6, spray nozzle 1050 may be in fluid communication, via lines 1051 and 1052 respectively, with a source 1057 of component A and a source 1058 of component B of a polyurethane foam-forming composition. In these implementations component A may comprise a polyisocyanate, such as any of those described earlier in this specification, and component B may comprise an isocyanate-reactive composition, which, for example, may comprise polyol(s), blowing agent(s), catalyst(s) and surfactant(s), among other possible ingredients. In the implementation depicted in FIG. 6, component A is in fluid communication with spray nozzle 1050 via feed line 1051, while component B is separately in fluid communication with spray nozzle 1050 via fee line 1052 and components A and B are mixed with each other as they pass through the spray nozzle 1050 to form the polyurethane foam-forming composition. In some implementations, the system is configured to meter and mix component A and component B at a 1:1 volume ratio.

Robot 1040 may itself include or be in communication with a computing device 1300. The computing device is configured to receive data from imaging device 1060 when imaging device 1060 surveys the cavity of wall structure 1020 (as described earlier in this specification). Computing device 1300 contains software code for determining, based on data received from imaging device 1060, the amount of foam-forming composition components to add to achieve a require thickness for foam layer 1025 and for determining an ideal spray pattern to minimize variations in the depth of foam layer 1025. The computing device may contain or be in communication with a database that contains quality data for wall structure 1020. Such quality data may include (but is not limited to) data with respect to required average thickness of foam layer 1025 and/or maximum deviations allowed from a target thickness in foam layer 1025 in any one location. Thus, computing device may contain software code for calculating corrections that need to be made to foam layer 1025 in the event that the quality and depth of foam layer is not adequate (as described earlier).

Various aspects of the subject matter described herein are set out in the following numbered clauses:

Clause 1. A method for manufacturing a foam wall structure, comprising: (a) placing a wall structure proximate to a robotic arm, the wall structure comprising: (1) a frame comprising a first member, a second member that is spaced apart from the first member, and connecting members extending between the first member and the second member, wherein a front surface of the first member, a front surface of the second member, and a front surface of the connecting members form a front frame surface; and (2) a panel, such as a foam panel (such as a polyisocyanurate foam or a polystyrene foam, such as a foam panel comprising a foam core layer and a facer attached to a front face and/or a rear face of the foam core layer), attached to the front frame surface so that the panel, the first member, the second member, and the connecting members define a cavity, wherein the robotic arm comprises: (1) a spray nozzle, and (2) an imaging device; (b) orienting the imaging device so that the imaging device faces the cavity; (c) surveying the cavity using the imaging device; (d) determining a spray foaming pattern to fill the cavity to a selected depth with a foam layer; (e) orienting the spray nozzle so the spray nozzle faces the cavity; and (f) spray-applying a foam-forming composition into the cavity according to the spray foaming pattern by passing the foam-forming composition through the spray nozzle to form the foam layer.

Clause 2. The method of clause 1, wherein the wall structure is placed proximate to the robotic arm by conveying the wall structure using a conveyor, such as, a belt conveyor, a roller conveyor, a slat conveyor, or a chain conveyor, any of which can be motorized or not motorized and any of which can be floor or overhead mounted.

Clause 3. The method of clause 1 or clause 2, wherein the wall structure is placed proximate to the robotic arm in a substantially horizontal orientation.

Clause 4. The method of one of clause 1 to clause 3, wherein the cavity is an open cavity.

Clause 5. The method of one of clause 1 to clause 4, wherein the imaging device and/or the spray nozzle is rotatably mounted, such as via a swivel joint, a ball joint, or a U-joint, to the robotic arm, so that imaging device and/or spray nozzle swivel in any direction relative to the position and orientation of the wall structure.

Clause 6. The method of one of clause 1 to clause 5, wherein the imaging device is a camera, such as an analog camera, digital camera, thermal imaging camera, motion camera, or an acoustic camera.

Clause 7. The method of one of clause 1 to clause 6, further comprising determining which cavities in a wall structure are those for which a foam layer is desired and determining which cavities in a wall structure are those for which no foam layer is desired.

Clause 8. The method of clause 7, wherein cavities of the wall structure comprise a visual marking in any cavities for which a foam layer is not desired.

Clause 9. The method of clause 8, wherein a computing device instructs a robot not to a spray foam-forming composition into any cavities of wall structure that contains the visual marking.

Clause 10. The method of one of clause 1 to clause 9, further comprising determining, based on image(s) produced by the imaging device, whether a foam layer is present in an open cavity, such as where such a determination is made by a computing device that itself is a part of a robot or that is a separate component that is in communication with a robot.

Clause 11. The method of one of clause 1 to clause 10, wherein a computing device receives data from imaging device when imaging device surveys the cavity of the wall structure and determines, using software code, the amount of foam-forming composition components to add to achieve a require thickness for the foam layer and for determining a spray pattern to minimize variations in the depth of the foam layer.

Clause 12. The method of clause 11, wherein the computing device retrieves quality data for the wall structure, which may be present in a database, and which may include data with respect to required average thickness of foam layer and/or data with respect to the maximum deviations allowed from a target thickness in foam layer in any one location.

Clause 13. The method of one of clause 1 to clause 12, wherein the foam layer is dimensioned to expand to a position intermediate the front frame surface and a rear frame surface, thereby forming a gap within the foam wall structure between the foam layer and the rear frame surface.

Clause 14. The method of clause 13, wherein the foam layer has a depth of the foam layer of 1 to 1½ inches.

Clause 15. The method of one of clause 1 to clause 14, wherein the foam layer comprises polyurethane, polyurea, or polyisocyanurate, or a mixture thereof.

Clause 16. The method of clause 15, wherein the foam layer has a density of at least 2.8 lb/ft$^3$ (44.9 kg/m$^3$), such as 2.8 to 4.0 lb/ft3 (44.9 to 64.1 kg/m3), or, in some cases, 3.0 to 4.0 lb/ft3 (48.1 to 64.1 kg/m3) or 3.2 to 3.8 lb/ft3 (51.3 to 60.9 kg/m3) or 3.4 to 3.8 lb/ft3 (54.5 to 60.9 kg/m3), when measured according to ASTM D1622-08.

Clause 17. The method of one of clause 1 to clause 15, further comprising orienting the robotic arm so that the imaging device faces the open cavity of the wall structure in which the foam layer has been deposited and surveying the quality and depth of the foam layer.

Clause 18. The method of clause 17, further comprising orienting the robotic arm so the spray nozzle faces the cavity and spray-applying the foam-forming composition into the cavity to correct any deficiencies in the foam layer.

Clause 19. A foam wall structure manufacturing system, comprising: (a) a conveyor configured to place a wall structure proximate to a robotic arm in a substantially horizontal orientation, the wall structure comprising: (1) a frame comprising a first member, a second member that is spaced apart from the first member, and connecting members extending between the first member and the second member, wherein a front surface of the first member, a front surface of the second member, and a front surface of the connecting members form a front frame surface; and (2) a panel, such as a foam panel (such as a polyisocyanurate foam or a polystyrene foam, such as a foam panel comprising a foam core layer and a facer attached to a front face and/or a rear face of the foam core layer), attached to the front frame surface so that the panel, the first member, second member, and the connecting members define an open cavity; (b) a robotic arm comprising: (1) a spray nozzle configured to capable of facing the cavity, and (2) an imaging device configured to be capable of facing the cavity; and (c) a source of foam-forming composition components in fluid communication with the spray nozzle.

Clause 20. The foam wall structure manufacturing system of clause 19, wherein the robotic arm comprises the spray nozzle attached thereto at a side thereof and the imaging device attached thereto at a side thereof.

Clause 21. The foam wall structure manufacturing system of clause 19 or clause 20, wherein the spray nozzle is mounted to the robotic arm via an extension that extends radially from a side of the robotic arm and the imaging device is mounted to the robotic arm via extension that extends radially from an opposite side of robotic arm.

Clause 22. The foam wall structure manufacturing system of one of clause 19 to clause 21, further comprising a rear robotic arm hinged to the robotic arm about an axis, such that the robotic arm extends downwardly with respect to the rear robotic arm and towards the wall structure.

Clause 23. The foam wall structure manufacturing system of clause 22, wherein the rear robotic arm extends as a cantilever from a base, such as a rotatable base.

Clause 24. The foam wall structure manufacturing system of clause 23, wherein the base is mounted onto a platform, such as a bridge comprising legs configured so that the wall structure may be conveyed in a substantially horizontal orientation under the bridge between the legs.

Clause 25. The foam wall structure manufacturing system of one of clause 19 to clause 24, wherein the imaging device is rotatably mounted, such as via a swivel joint, a ball joint, or a U-joint, to an extension on the robotic arm so that imaging device can swivel in any direction relative to the position and orientation of wall structure.

Clause 26. The foam wall structure manufacturing system of one of clause 19 to clause 25, wherein the cavity is an open cavity in which a rear frame surface is not covered.

Clause 27. The foam wall structure manufacturing system of one of clause 19 to clause 26, wherein the imaging device is a camera, such as an analog camera, a digital camera, a thermal imaging camera, a motion camera, or an acoustic camera.

Clause 28. The foam wall structure manufacturing system of one of clause 19 to clause 27, wherein the conveyor is a belt conveyor, a roller conveyor, a slat conveyor, or a chain conveyor.

Clause 29. The foam wall structure manufacturing system of one of clause 19 to clause 28, wherein the spray nozzle is in fluid communication with one or more sources of foam-forming composition components, such as where the foam-forming composition components comprise a first component of a polyurethane foam-forming composition and a second component of a polyurethane foam-forming composition.

Clause 30. The foam wall structure manufacturing system of clause 29, wherein the first component comprises a polyisocyanate and the second component comprises an isocyanate-reactive composition, which may comprise a blend of polyol(s), blowing agent(s), catalyst(s) and surfactant(s).

Clause 31. The foam wall structure manufacturing system of clause 30, wherein system is configured so that the first component and the second component are mixed with each other as they pass through the spray nozzle, such as where the first component and the second component are mixed at a 1:1 volume ratio.

Clause 32. The foam wall structure manufacturing system of one of clause 19 to clause 31, further comprising a computing device configured to receive data from the imaging device.

Clause 33. The foam wall structure manufacturing system of clause 32, wherein the computing device contains software code for determining, based on data received from imaging device, the amount of foam-forming composition components to add to achieve a required thickness for the foam layer and for determining an ideal spray pattern to minimize variations in the depth of the foam layer.

Clause 34. The foam wall structure manufacturing system of clause 32 or clause 33, further comprising a database comprising quality data for the wall structure, such database configured to communicate with the computing device.

Clause 35. The foam wall structure manufacturing system of one of clause 32 to clause 34, wherein the computing device contains software code for calculating corrections that need to be made to the foam layer based on data received from the imaging device.

Various features and characteristics of the inventions are described in this specification to provide an overall understanding of the disclosed wall structures and method of manufacture. It is understood that the various features and characteristics described in this specification can be combined in any suitable manner regardless of whether such features and characteristics are expressly described in combination in this specification. The Applicant expressly intends such combinations of features and characteristics to be included within the scope of this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with written description and sufficiency of description requirements (e.g., 35 U.S.C. § 112(a) and Article 123(2) EPC). The wall structures and methods disclosed in this specification can comprise, consist of, or consist essentially of the various features and characteristics described in this specification.

Also, any numerical range recited in this specification describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will not add new matter to the specification or claims, and will comply with written description and sufficiency of description requirements (e.g., 35 U.S.C. §§ 112(a) and Article 123(2) EPC). Additionally, numerical parameters described in this specification should be construed in light of the number of reported significant digits, the numerical precision of the number, and by applying ordinary rounding techniques. It is also understood that numerical parameters described in this specification will necessarily possess the inherent variability characteristic of the underlying measurement techniques used to determine the numerical value of the parameter.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described processes, compositions, and products. Further, the use of a singular noun includes the plural, and the use of a plural noun includes the singular, unless the context of the usage requires otherwise.

What is claimed is:

1. A method for manufacturing a foam wall structure, comprising:
   (a) conveying a wall structure with a conveyor so as to place the wall structure proximate to a robot comprising a robotic arm, the wall structure comprising:
      (1) a frame comprising a first member, a second member that is spaced apart from the first member, and connecting members extending between the first member and the second member, wherein a front surface of the first member, a front surface of the second member, and a front surface of the connecting members form a front frame surface; and
      (2) a panel attached to the front frame surface so that the panel, the first member, the second member, and the connecting members define an open cavity, wherein the robotic arm comprises:
         (i) a spray nozzle, and
         (ii) a camera;
   (b) orienting the camera so that the camera faces the open cavity;
   (c) surveying the open cavity using the camera to determine, using software code and based on an image produced by the camera, whether a foam layer is desired in the open cavity;
   (d) if a foam layer is not desired in the open cavity, then repeating step (c) for another open cavity or, if a foam layer is desired in the open cavity, determining a spray foaming pattern to fill the open cavity to a selected depth with a foam layer;
   (e) orienting the spray nozzle so that the spray nozzle faces the open cavity; and
   (f) spray-applying a foam-forming composition into the open cavity according to the spray foaming pattern by passing the foam-forming composition through the spray nozzle to deposit the foam-forming composition in the open cavity to thereby form the foam layer.

2. The method of claim 1, wherein the panel is a foam panel.

3. The method of claim 1, wherein the wall structure is placed proximate to the robotic arm in a substantially horizontal orientation.

4. The method of claim 3, wherein the robotic arm extends downwardly and is suspended over the conveyor when the spray nozzle is oriented to face the open cavity.

5. The method of claim 3, wherein the robotic arm extends from a bridge comprising legs that are configured such that the wall structure is conveyed under the bridge between the legs of the bridge.

6. The method of claim 1, wherein a computing device instructs the robot not to spray foam-forming composition into any open cavities of the wall structure containing a visual marking to indicate that no foam layer is desired.

7. The method of claim 1, wherein a computing device receives data from the camera and determines, using software code, an amount of foam-forming composition components to add to achieve a required thickness for the foam layer and for determining a spray pattern to minimize variations in the depth of the foam layer.

8. The method of claim 7, wherein the computing device retrieves quality data for the wall structure from a database, the quality data comprising a required average thickness of foam layer and/or a maximum deviation from a target thickness of the foam layer in any one location.

9. The method of claim 1, wherein the foam layer comprises a polyurethane foam having a density of at least 2.8 lb/ft$^3$ (44.9 kg/m$^3$), when measured according to ASTM D1622-08.

10. The method of claim 1, further comprising orienting the robotic arm so that the camera faces the open cavity of the wall structure in which a foam layer has been deposited and surveying the foam layer with the camera.

11. The method of claim 10, further comprising re-orienting the robotic arm so the spray nozzle faces the open cavity and spray-applying the foam-forming composition into the open cavity to correct any deficiencies in the foam layer.

12. The method of claim 1, wherein the conveyor is a belt conveyor, a roller conveyor, a slat conveyor, a chain conveyor, a hand push beam trolley system, or a monorail.

13. A method for manufacturing a foam wall structure, comprising:
   (a) conveying a wall structure with a conveyor so as to place the wall structure proximate to a robot comprising a robotic arm, the wall structure comprising:
      (1) a frame comprising a first member, a second member that is spaced apart from the first member, and connecting members extending between the first member and the second member, wherein a front surface of the first member, a front surface of the second member, and a front surface of the connecting members form a front frame surface; and
      (2) a panel attached to the front frame surface so that the panel, the first member, the second member, and the connecting members define an open cavity, wherein the robotic arm comprises:
         (i) a spray nozzle, and
         (ii) a camera;
   (b) orienting the camera so that the camera faces the open cavity;
   (c) surveying the open cavity using the camera to determine, using software code and based on an image produced by the camera, whether a foam layer is desired in the open cavity;
   (d) if a foam layer is not desired in the open cavity, then repeating step (c) for another open cavity or, if a foam layer is desired in the open cavity, determining a spray foaming pattern to fill the open cavity to a selected depth with a foam layer;
   (e) orienting the spray nozzle so the spray nozzle faces the open cavity;
   (f) spray-applying a foam-forming composition into the open cavity according to the spray foaming pattern by passing the foam-forming composition through the spray nozzle to form the foam layer;
   (g) orienting the camera so that the camera faces the open cavity of the wall structure in which the foam layer has been deposited; and
   (h) surveying the foam layer using the camera.

14. The method of claim 13, further comprising orienting the spray nozzle so the spray nozzle faces the foam layer and spray-applying the foam-forming composition into the open cavity to correct any deficiencies in the foam layer.

15. The method of claim 13, wherein the panel is a foam panel.

16. The method of claim 13, wherein the wall structure is placed proximate to the robotic arm in a substantially horizontal orientation.

17. The method of claim 16, wherein the robotic arm extends downwardly and is suspended over the conveyor when the spray nozzle is oriented to face the open cavity.

18. The method of claim 16, wherein the robotic arm extends from a bridge comprising legs that are configured such that the wall structure is conveyed under the bridge between the legs of the bridge.

19. The method of claim 13, wherein a computing device instructs the robot not to spray foam-forming composition into any cavities of the wall structure containing a visual marking to indicate that no foam layer is desired.

20. The method of claim 13, wherein a computing device receives data from the camera and determines, using software code, an amount of foam-forming composition components to add to achieve a require thickness for the foam layer and for determining a spray pattern to minimize variations in the depth of the foam layer, wherein the determination comprises retrieving quality data for the wall structure from a database, the quality data comprising a required average thickness of foam layer and/or a maximum deviation from a target thickness of the foam layer in any one location.

21. The method of claim 13, wherein the foam layer comprises a polyurethane foam having a density of at least 2.8 lb/ft$^3$ (44.9 kg/m$^3$), when measured according to ASTM D1622-08.

22. The method of claim 13, wherein the conveyor is a belt conveyor, a roller conveyor, a slat conveyor, a chain conveyor, a hand push beam trolley system, or a monorail.

* * * * *